(12) United States Patent
Naccari et al.

(10) Patent No.: US 9,554,102 B2
(45) Date of Patent: Jan. 24, 2017

(54) PROCESSING DIGITAL IMAGES TO BE PROJECTED ON A SCREEN

(71) Applicant: STMicroelectronics S.R.L., Agrate Brianza (IT)

(72) Inventors: Filippo Naccari, Tremestieri Etneo (IT); Angelo Bosco, Giarre (IT); Mirko Guarnera, San Giovanni La Punta (IT)

(73) Assignee: STMICROELECTRONICS S.R.L., Agrate Brianza (IT)

( * ) Notice: Subject to any disclaimer, the term of this patent is extended or adjusted under 35 U.S.C. 154(b) by 224 days.

(21) Appl. No.: 14/133,381

(22) Filed: Dec. 18, 2013

(65) Prior Publication Data
US 2014/0168516 A1 Jun. 19, 2014

(30) Foreign Application Priority Data

Dec. 19, 2012 (IT) .............................. MI2012A2180

(51) Int. Cl.
*G06T 3/00* (2006.01)
*G06T 5/00* (2006.01)
(Continued)

(52) U.S. Cl.
CPC .......... *H04N 9/3173* (2013.01); *H04N 9/3182* (2013.01); *H04N 9/3194* (2013.01); *H04N 9/67* (2013.01)

(58) Field of Classification Search
CPC combination set(s) only.
See application file for complete search history.

(56) References Cited

U.S. PATENT DOCUMENTS

2003/0214510 A1 11/2003 Tajima
2003/0227577 A1 12/2003 Allen et al.
(Continued)

FOREIGN PATENT DOCUMENTS

EP 1804518 7/2007
EP 1933200 6/2008

OTHER PUBLICATIONS

Italian Search Report for Italian Application No. MI20122180, Ministero dello Sviluppo Economico, Munich, Germany, Jul. 25, 2013, 2 pages.

*Primary Examiner* — Wesner Sajous
(74) *Attorney, Agent, or Firm* — Seed IP Law Group LLP

(57) ABSTRACT

An embodiment relates to a method for converting a digital image from a first color space to a second color space. The first color space is associated with an electronic source device, and the second color space is associated with a projection apparatus of digital images on a screen and coupled to the source device. The method includes: performing a first conversion on a first triad of parameters associated to the first color space by a first conversion matrix to map such a first triad in a third triad of parameters; the third triad is representative of a color space independent from the first and the second color spaces; performing a second conversion on the third triad of parameters by a second conversion matrix to map such a third triad of parameters in a second triad of parameters representative of the second color space. An embodiment of the step of performing the second conversion includes a step of computing the coefficients of the second conversion matrix based on at least one first piece of information representative of a variable distance between the projection apparatus and the screen.

17 Claims, 5 Drawing Sheets

(51) Int. Cl.

| | |
|---|---|
| *G09G 5/02* | (2006.01) |
| *G09G 1/28* | (2006.01) |
| *G09G 5/06* | (2006.01) |
| *H04N 1/60* | (2006.01) |
| *H04N 5/58* | (2006.01) |
| *H04N 9/73* | (2006.01) |
| *H04N 3/14* | (2006.01) |
| *H04N 9/31* | (2006.01) |
| *H04N 9/67* | (2006.01) |

(56) References Cited

U.S. PATENT DOCUMENTS

| | | | |
|---|---|---|---|
| 2007/0188623 A1* | 8/2007 | Yamashita | G06T 5/004 348/222.1 |
| 2009/0196494 A1* | 8/2009 | Kanai | G09G 5/06 382/162 |
| 2010/0079468 A1 | 4/2010 | Pance et al. | |
| 2010/0118008 A1* | 5/2010 | Matsuoka | G09G 5/026 345/207 |
| 2010/0177247 A1* | 7/2010 | Sekulovski | H05B 37/029 348/602 |
| 2010/0245381 A1* | 9/2010 | Samadani | G09G 5/06 345/593 |
| 2011/0026052 A1* | 2/2011 | Edge | G01J 3/46 358/1.9 |
| 2011/0026821 A1* | 2/2011 | Edge | H04N 1/6052 382/167 |
| 2011/0141104 A1* | 6/2011 | Tin | H04N 13/0025 345/419 |
| 2011/0235907 A1* | 9/2011 | Kishimoto | H04N 1/6058 382/167 |

\* cited by examiner

PROCESSING DIGITAL IMAGES TO BE PROJECTED ON A SCREEN

PRIORITY CLAIM

The instant application claims priority to Italian Patent Application No. MI2012A002180, filed Dec. 19, 2012, which application is incorporated herein by reference in its entirety.

TECHNICAL FIELD

An embodiment relates to a method for processing digital images to be projected on a screen and a related projection apparatus. In particular, an embodiment relates to a method for converting digital images from a first color space to a second color space.

SUMMARY

In the field of digital-image-processing systems, the term "color management" generally indicates a set of controlled operations to carry out a conversion of color representation of images so as to adapt them to mutually different electronic apparatuses and devices, such as, for example, scanners, digital cameras, monitors, television screens, printers, projectors, and the like.

In fact, as it is known, each of the above-mentioned devices is characterized by a respective "gamut", i.e., a range of colors that the device is able to produce, reproduce, or capture, which substantially corresponds to a subset of the visible colors. Color representations, or color spaces, of a known type and widely used in the above-mentioned electronic devices are, for example, Adobe RGB, sRGB, or proPhoto RGB.

In a conversion operation of the color space of an image, a color-management module (CMM) is configured to translate the colors from the color space of a device to that of another device. A goal of such a conversion step is to create a better matching between different devices—even when the latter apparently seem mutually incompatible.

Generally, in order to carry out such a conversion of the representation of a color from one color space to another color space, the color-management module includes a color-processing pipeline that can be described, as an example, with reference to the appended FIG. 5.

In particular, such a color-management module, generally indicated with the numeral reference 500, is suitable to receive, at an input 501, the image to be converted generated or extracted by/from a respective source device (not shown). Each pixel of the image is characterized by color data and information, indicated with R', G', B', that are typical of the color space of the source device, such as, for example, sRGB, or adobe RGB.

Such color information R', G', B', which represent non-linear input signals, are converted, from a first block 502, into signals of a linear space R, G, B provided in input to a conversion block 503 of the color space.

As it will be apparent to those killed in the art, such a conversion block 503 operates in a standard linear color space to map the above-mentioned linear signals R, G, B to three respective linear monochromatic color primitives $R_D$, $G_D$, $B_D$ that are typical of a target device (not shown).

Furthermore, non-linear primitives $R_D'$, $G_D'$, $B_D'$ are provided to the target device on an output 505 of the color-management module 500 after the non-linear conversion performed by a second block 504. Such a second block 504 is suitable to perform a conversion complementary to that of the first block 502.

As it is known, the colors displayed on the target device represent a combination of the intensity of the three non-linear color primitives (or primaries) $R_D'$, $G_D'$, $B_D'$.

The conversion method of the color spaces, as described above, to mutually adapt different devices suffers from several drawbacks, in particular, for some applications.

One of such applications is an application where the target device is a portable projector, particularly a pico-projector, which can be coupled to another electronic device acting as a source device for the images, for example, a camera, a notebook, a smartphone, or a tablet, to allow the projection of multimedia files such as images, videos, and the like, stored in such a source device. In fact, the portable projector ensures a reduced intensity of light flow (measured in lumens), for example, to tens of lumens, compared to a conventional projector due to reduced supply levels with which it is operated. Furthermore, the precision of images projected on a screen from such a portable device can be degraded by multiple factors, among which, for example, are the mutual distance between the projector and the projection surface, the characteristics of the projection surface itself (for example, the reflectance characteristics of such a surface), as well as the lighting conditions of the environment in which the projection occurs.

An embodiment is a method for converting a digital image from a first color space, associated with a source device, to a second color space, associated with an electronic apparatus, for the projection of such digital image that allows at least partially obviating the drawbacks mentioned above relative to the above-mentioned projection apparatuses of a known type.

Another embodiment is an electronic apparatus for the projection of digital images on a screen.

BRIEF DESCRIPTION OF THE DRAWINGS

Characteristics and advantages of one or more embodiments are set forth below by way of indicative, non-limiting examples, with reference to the appended figures, in which.

DETAILED DESCRIPTION

Figure 1:
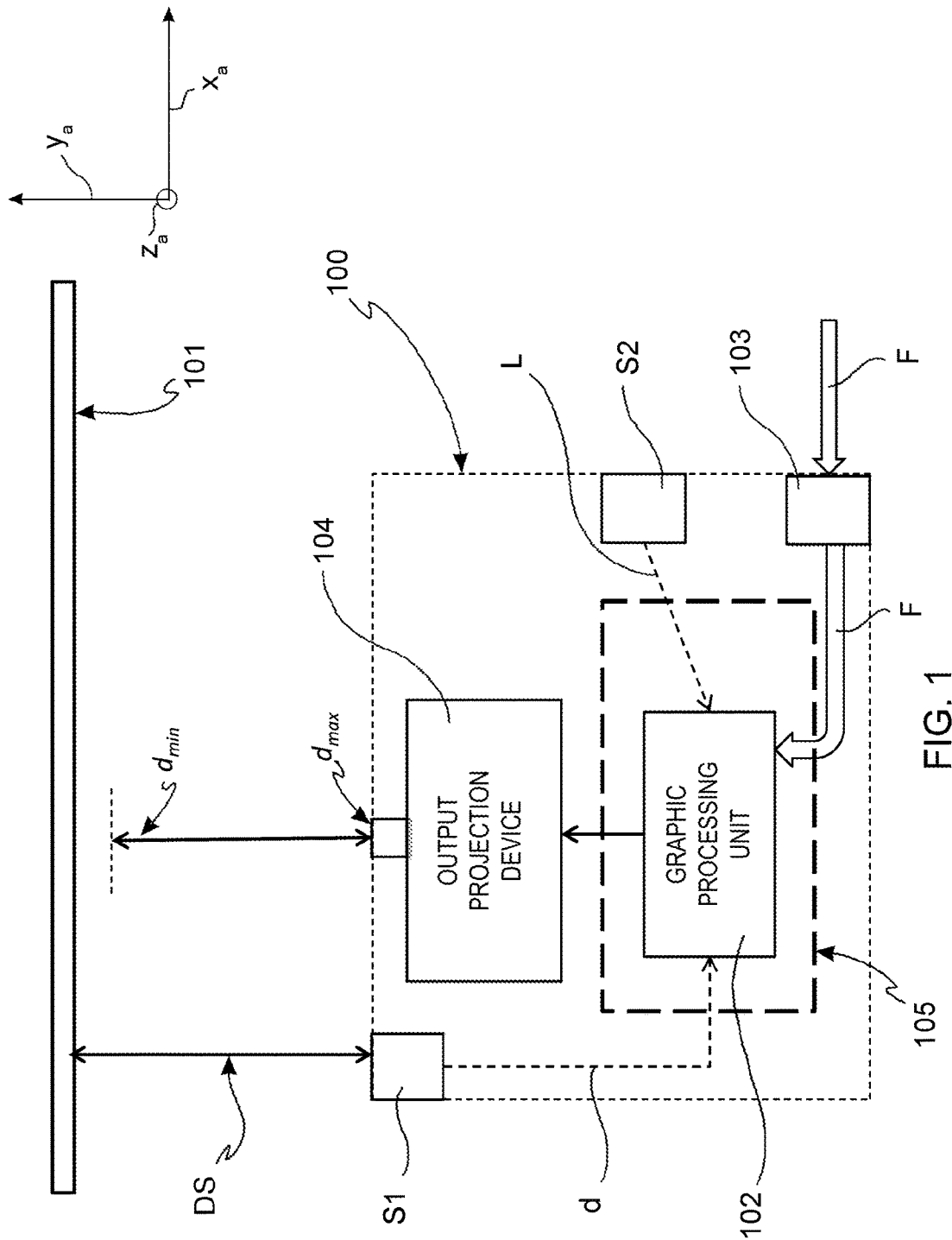
FIG. 1 is a block diagram of a projection apparatus of images on a screen implementing a conversion method according to an embodiment.

With reference to FIG. 1, an implementation example of an electronic apparatus for the projection of digital images on a screen 101 is generally indicated with the numeral reference 100, according to an embodiment. Such an electronic-image projection apparatus 100 will be referred to herein below, for the sake of simplicity, as an "image-projection apparatus," or simply a "projection apparatus."

Such an image-projection apparatus 100 includes an input unit 103 to receive a flow F of digital images to be projected on a screen 101. An electronic source device (not shown in FIG. 1) is configured to generate such a flow F. Such a source device is implemented, for example, by a camera, a notebook, a smartphone, or a tablet, or a similar device suitable to acquire, process, and store multimedia files (pictures, videos, slideshows, etc.).

Furthermore, the projection apparatus 100 includes a graphic processing unit 102 of the image flow F coupled to the input unit 103, and an output projection device 104 in communication with the above-mentioned graphic processing unit 102. In more detail, the output projection device 104 is configured to project the processed images on the screen 101, and it may include, for example, a laser projector or a LED projector.

Herein below, it will be assumed that the output projection device 104 is implemented by a laser-type projector, in particular, a laser pico-projector. As it is known, a laser projector is able to generate and represent a range of colors or "gamut" wider than that of a LED projector. However, the intrinsic characteristics and the properties of an embodiment can be advantageously applied also to projectors different from laser projectors, for example, LED projectors, or projectors obtained in accordance with LCOS (Liquid Crystal on Silicon) technology, and generally to all the color-image projectors including light sources capable of generating a chromatic gamut that is wider than that associated with standard color spaces.

In addition, the electronic apparatus 100 includes a first sensor, or distance sensor S1, suitable to detect a linear distance DS of the apparatus 100 from the screen 101 to generate a first signal, or distance d signal, indicative of the detected distance DS to be sent to the graphic processing unit 102.

With reference to the orientation of the Cartesian axes xa, ya, za of FIG. 1, by a distance d from the screen 101 will be meant herein below both the distance measured along the direction ya substantially orthogonal to the screen 101, i.e., the device 104 projects the images along such a direction ya, and the distance measured along any direction obtained by tilting the device 104 with respect to such a direction ya, i.e., by moving the projection device 104 in the plane xa-ya or in the plane ya-za.

With reference to FIG. 1, preset information of minimum and maximum distances between the projection apparatus 100 and the screen 101 are indicated with the references $d_{min}$ and $d_{max}$, respectively. In particular, such a maximum distance $d_{max}$ represents the maximum distance at which the laser pico-projector 104 is able to reproduce, substantially without alteration, a color gamut of the input image to be projected that is smaller (input small gamut) than the total color gamut that the laser projector 104 is otherwise able to reproduce.

Furthermore, the projection apparatus 100 includes a second sensor, or ambient-light sensor S2, suitable to detect the lighting intensity of the environment in which the projection apparatus operates in order to generate a respective second signal, or lightness-intensity signal L. In particular, such a lightness-intensity signal L is provided to the graphic processing unit 102.

In addition, the projection apparatus 100 includes a central processing unit 105 (illustrated by the dotted square) configured to at least partially control the input unit 103, the graphic processing unit 102, the output projection device 104, and the first S1 and the second S2 sensors. Such a central processing unit 105 is implemented, for example, by a CPU (Central Processing Unit) microprocessor or a microcontroller.

In an embodiment, the central processing unit 105 includes the above-mentioned graphic processing unit 102, i.e., it implements the functions thereof.

In another embodiment, the graphic processing unit 102 includes a hardware accelerator separated from the central processing unit 105, but coupled thereto.

In an embodiment, the electronic apparatus 100 for the projection of digital images is implemented by a portable pico-projector obtained as a pico-projector of the stand-alone type, which can be coupled to the electronic source device of the image flow F to allow the projection on the screen 101 of the multimedia files stored in such a source device.

In an alternative embodiment, the projection apparatus 100 is configured to be provided within the portable electronic source device such as, for example, a smartphone or a tablet.

Figure 2:
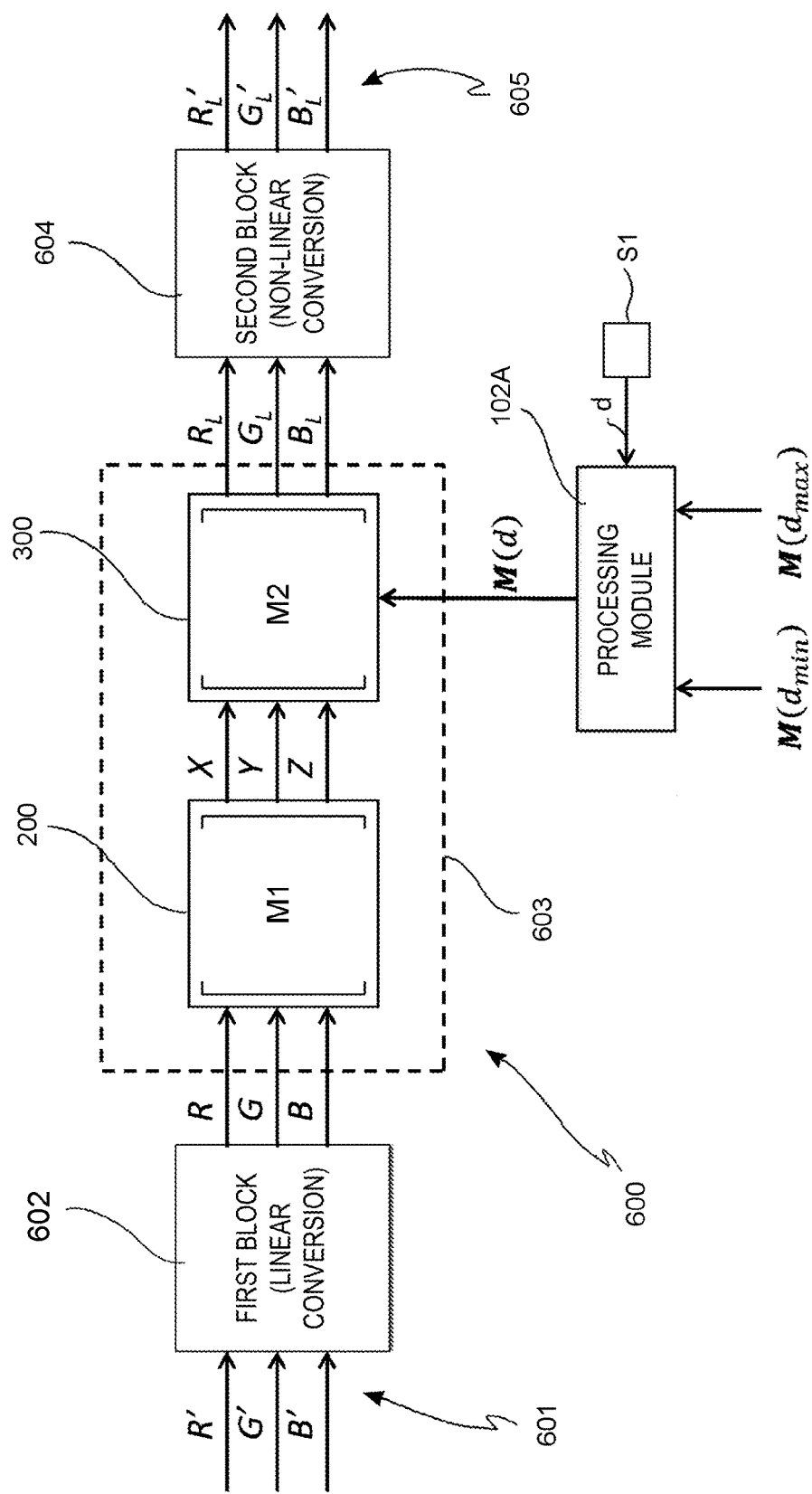
FIG. 2 is a functional block diagram of a conversion module of a color space implementing an embodiment of a conversion method.
Figure 3:
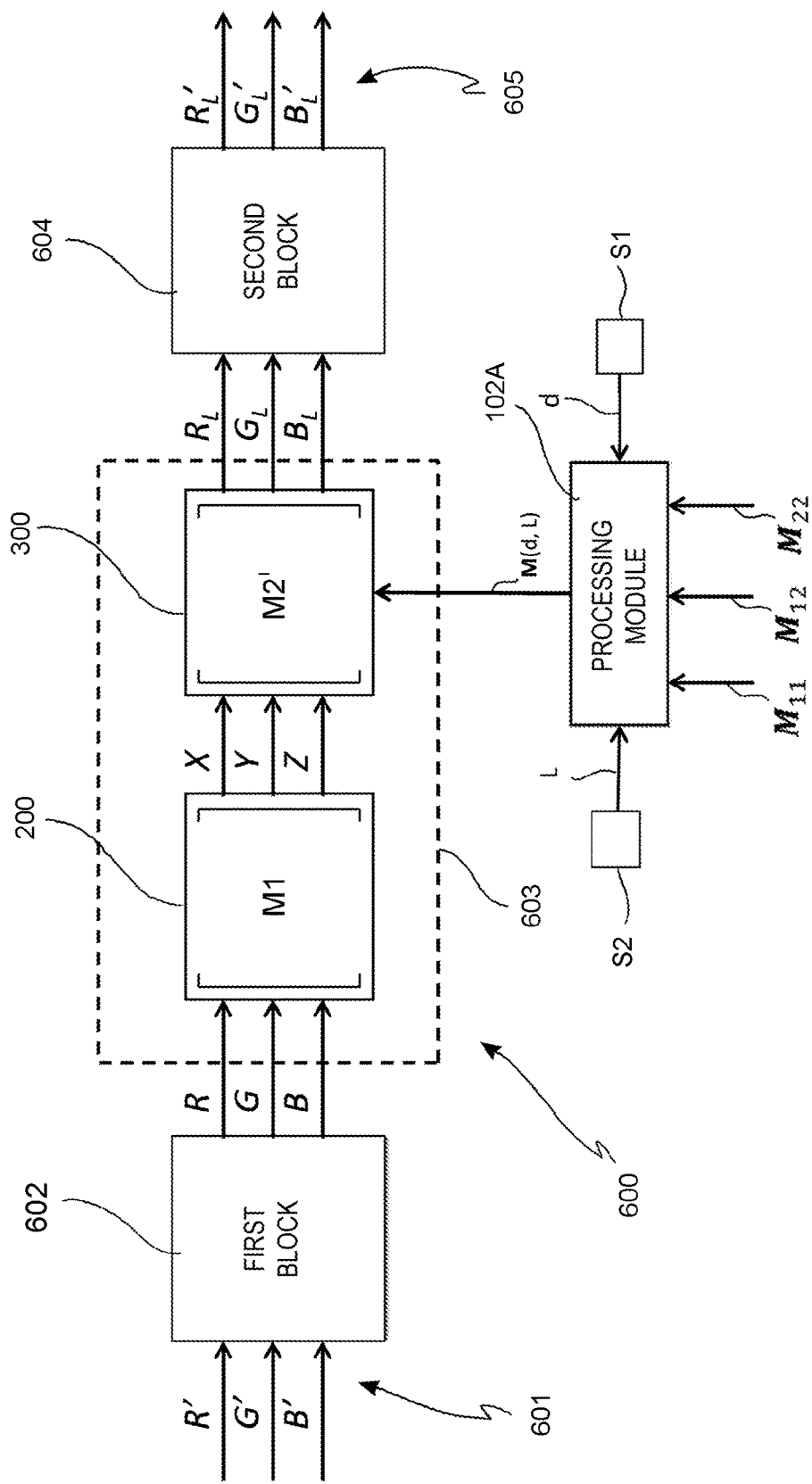
FIG. 3 is a functional block diagram of a conversion module of a color space implementing another embodiment of a conversion method.
Figure 4:
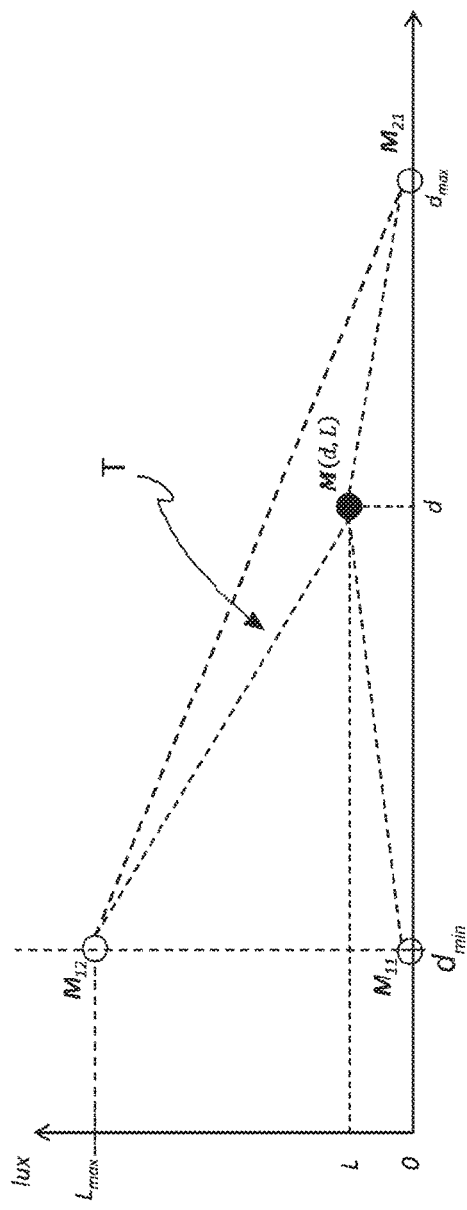
FIG. 4 is a Cartesian diagram of lightness values referred to the distance of the projection apparatus from the screen according to an embodiment of a conversion method.
Figure 5:
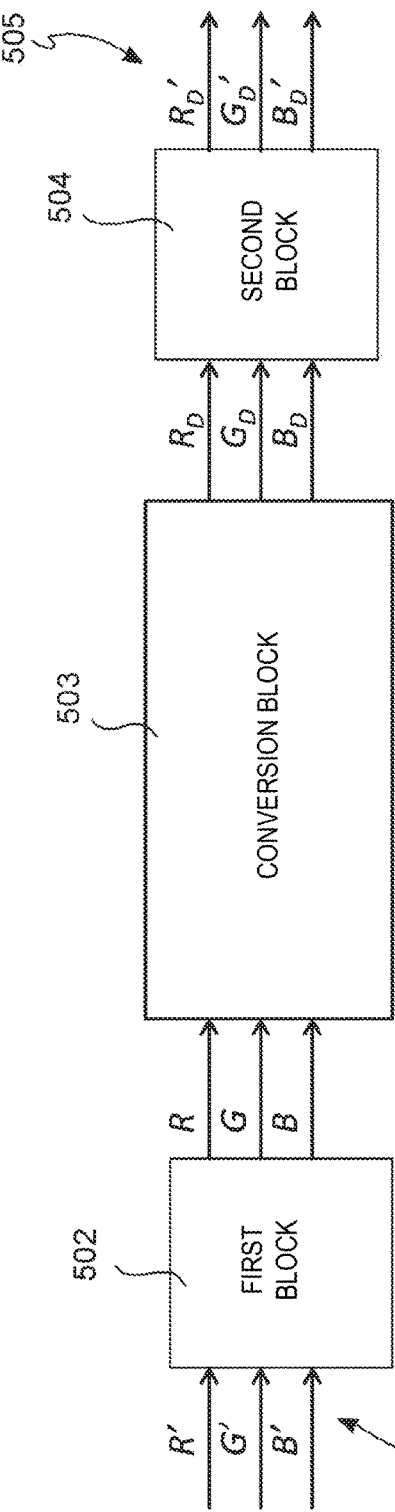
FIG. 5 illustrates a color-management module.

With reference to FIGS. 2, 3, and 4, two embodiments of a method for converting a digital image from a first color space to a second color space are described in detail.

In FIGS. 1, 2, 3, the same or like elements are indicated with the same numeral references.

The above-mentioned first color space is associated with the electronic source device of the image flow F, and the second color space is associated with the laser pico-projector 104 of the digital-image projection apparatus 100 described above.

As known, in the first color space, each pixel of an image is associated with a triad of parameters R, G, B representative of such a first color space. In the second color space, each pixel of the same image is associated with a respective further triad of parameters $R_L$, $G_L$, $B_L$ representative of such a second color space.

A color-management module (CMM) configured to translate the colors from the color space of the source device into the color space of the laser pico-projector 104 is indicated in FIGS. 2 and 3 with the numeral reference 600. In particular, such a color-management module 600 includes a pipeline or color-processing pipeline implemented within the graphic processing unit 102 described above with reference to FIG. 1.

Such a color management module 600 is suitable to receive at an input 601 the image to be converted, generated, or extracted from the source device. In particular, each pixel of the image to be converted is characterized by a first triad of information or color parameters R', G', B' that are typical of the color space of the source device, such as, for example, the color space sRGB or Adobe RGB.

Such a first triad of color information R', G', B' represents non-linear input signals supplied to a first block 602 of the management module 600 to be converted into a respective second triad R, G, B of signals relative to a linear color space. Such a first block 602 is configured to perform the linearization on the signals of the first triad R', G', B' based on a known linearization function, for example, a gamma decoding function.

The color-management module 600 further includes a color-space-conversion block 603 configured to receive in input the linearized signals of the second triad R, G, B. In particular, the conversion block 603 operates in the linear color space to map the above-mentioned linear signals of the second triad R, G, B into three respective linear monochromatic color primitives $R_L$, $G_L$, $B_L$ that are typical of the target laser pico-projector 104.

In more detail, the conversion block 603 includes a first conversion matrix 200 configured to map the linear signals of the second triad R, G, B in a third triad of parameters X,Y,Z representative of a color space independent from both the first and the second color spaces. In other terms, such a first conversion matrix 200, for example, a matrix M1 3×3, operates to convert the color parameters of the second triad R, G, B associated with each pixel of the image, for example, in the space sRGB, into the parameters X,Y,Z of the third triad relative to the independent color space.

Furthermore, the conversion block 603 includes a second conversion matrix 300 configured to perform a second conversion on said third triad of parameters X, Y, Z to map such a third triad X, Y, Z to a respective fourth triad of parameters including the above-mentioned linear monochromatic color primitives $R_L$, $G_L$, $B_L$ of the color space of the laser pico-projector 104. In other terms, the second conversion matrix 300, for example a matrix M2, is suitable to generate the laser coordinates $R_L$, $G_L$, $B_L$ of the pico-projector 104. Such a second conversion matrix 300 is a matrix 3×3 also indicated with the reference M2 (FIG. 2) relative to an embodiment of the method and with M2' (FIG. 3) with reference to another embodiment.

In addition, the color-management module 600 includes a second block 604 suitable to perform, on the linear monochromatic color primitives $R_L$, $G_L$, $B_L$, a conversion complementary to that performed by the first block 602. In more detail, such a second block 604 is suitable to perform a non-linear conversion, for example, a gamma coding, on the linear primitives $R_L$, $G_L$, $B_L$ to generate respective non-linear primitives $R_L'$, $G_L'$, $B_L'$ to be provided on an output 605 of the color management module 600 to be sent to the drivers of the laser pico-projector 104.

In particular, for each pixel of the image projected on the screen 101 (FIG. 1), the colors generated by the laser pico-projector 104 represent combinations of the intensities of the three color primitives (or primaries) $R_L'$, $G_L'$, $B_L'$ generated based on the procedure described above.

With reference to FIG. 2, in an embodiment of the method for converting a digital image, the step of performing the second conversion on the third triad of parameters X, Y, Z by the second conversion matrix M2 includes a step of computing coefficients of such a second matrix M2 based on the distance d piece of information between the projection apparatus 100 and the screen 101, i.e., on the distance d signal.

In more detail, in a characterization step of the projection apparatus 100, a first computing step of the coefficients of the second conversion matrix M2 corresponding to the preset minimum distance $d_{min}$ piece of information between the projection apparatus 100 and the screen 101 is provided for. This allows generating a first reference matrix $M(d_{min})$.

Similarly, again in such a characterization step, a second computing step of the coefficients of the second conversion matrix M2 corresponding to a preset maximum distance $d_{max}$ piece of information between the projection apparatus 100 and the screen 101 to generate a second reference matrix $M(d_{max})$ is provided for.

The above-mentioned characterization step according to an embodiment represents a balancing step of the chromatic response of the projection apparatus 100 at the above-mentioned minimum $d_{min}$ and maximum $d_{max}$ distances, performed before an operative or run-time step of the projection apparatus 100. In particular, such a characterization step may be performed only once, i.e., by balancing the projection apparatus 100 at the manufacturing site.

In particular, such balancing steps are performed to ensure that the projection apparatus 100 is able to reproduce, as the distance between $d_{min}$ and $d_{max}$ varies, and substantially without errors, the images in the color range (input small gamut) that is typical of the color spaces sRGB or Adobe RGB that is smaller than the range of colors that the laser pico-projector 104 can reproduce.

Once that the above-mentioned first $M(d_{min})$ and second $M(d_{max})$ reference matrices are computed, the latter are stored in a suitable memory, for example, a non-volatile memory (NVM) of the projection apparatus 100.

During the run-time step of the projection apparatus 100, the first sensor S1 provides the piece of information of the distance d between the projection apparatus 100 and the screen 101. In such a case, the coefficients of the second conversion matrix $M2=M(d)$ can be computed by a linear interpolation, as a function of the intermediate distance d values measured between the minimum $d_{min}$ and the maximum $d_{max}$ distances, in accordance with the following equation:

$$M(d) = \begin{cases} M(d_{min}), & d \leq d_{min} \\ \frac{(d - d_{min}) \cdot (M(d_{max}) - M(d_{min}))}{d_{max} - d_{min}} + M(d_{min}), & d_{min} < d < d_{max} \\ M(d_{max}), & d \geq d_{max} \end{cases} \quad (1)$$

in which:

$d_{min}$ and $d_{max}$ represent the preset minimum and maximum distances between the projection apparatus 100 and the screen 101;

$M(d_{min})$ and $M(d_{max})$ represent the first and the second reference matrices, respectively.

In particular, such an interpolation operation is performed by a processing module 102A included in the graphic processing unit 102.

Based on the equation (1), the second conversion matrix $M2=M(d)$ converts the third triad of parameters X, Y, Z into the fourth triad of parameters, i.e., into the linear monochromatic color primitives $R_L$, $G_L$, $B_L$ by taking into account the piece of information of the distance d between the pico-projector 104 and the screen 101. In other terms, the projection apparatus 100 may reproduce the reduced color gamut (input small gamut) in an accurate manner as the distance d from the screen between the above-mentioned minimum $d_{min}$ and maximum $d_{max}$ distances varies.

With reference to FIG. 3, another embodiment of the converting provides that carrying out the second conversion on the third triad of parameters X, Y, Z by the second conversion matrix M2' includes a step of computing the coefficients of such a second matrix M2' based both on the piece of information of the distance d between the projection apparatus 100 and the screen 101 and based on a second piece of information L representative of the ambient light intensity value detected by the second sensor S2.

In this case also, in the characterization step of the apparatus 100, preliminary balancing steps are provided for, of the chromatic response of the projection apparatus 100.

In particular, an embodiment provides for a first step of computing the coefficients of the second conversion matrix M2' corresponding to both the piece of information of preset minimum distance $d_{min}$ and an ambient light intensity value equal to zero. This allows generating a respective first reference matrix $M_{11}$.

Furthermore, a second step of computing the coefficients of the second conversion matrix M2' corresponding to both the piece of information of preset minimum distance $d_{min}$ between the projection apparatus 100 and the screen 101 and a maximum ambient light intensity value is provided for, i.e., $L=L_{max}$. In such a case, a respective second reference matrix $M_{12}$ is generated.

In addition, a third step of computing the coefficients of the second matrix M2' corresponding to the piece of information of preset maximum distance $d_{max}$ and the ambient light intensity value L equal to zero is provided for. In such a case, a respective third reference matrix $M_{22}$ is generated.

In this case also, such balancing steps can ensure that the projection apparatus 100 is able to reproduce, substantially without errors, the images in a reduced range of colors (input small gamut) as the distance d between the minimum distance $d_{min}$ and the maximum distance $d_{max}$ varies, and as the light intensity L between zero and the above-mentioned maximum value $L_{max}$ varies.

Once the above-mentioned first $M_{11}$, second $M_{12}$, and third $M_{22}$ reference matrices have been computed, they are stored in a suitable non-volatile memory of the projection apparatus 100.

During the run-time step of the projection apparatus 100, the first sensor S1 provides the piece of information of the distance d between the projection apparatus 100 and the screen 101, and the second sensor S2 provides the value of light intensity L of the environment in which the projection apparatus 100 operates.

The converting method of an embodiment provides that the coefficients of the second conversion matrix M2'=M(d, L) can be computed by a bilinear interpolation as a function of the values of distance d which are intermediate between the minimum $d_{min}$ and the maximum $d_{max}$ distances, and as a function of the light intensity values ranging between zero and $L_{max}$.

As known, a general bilinear interpolation can be expressed by the following equation:

$$M(d, L) = \frac{(d_{max} - d)(L_{max} - L)}{(d_{max} - d_{min})(L_{min} - L_{max})} \cdot M_{11} + \frac{(d - d_{min})(L_{max} - L)}{(d_{max} - d_{min})(L_{min} - L_{max})} \cdot M_{21} + \frac{(d_{max} - d)(L - L_{min})}{(d_{max} - d_{min})(L_{min} - L_{max})} \cdot M_{12} + \frac{(d - d_{min})(L - L_{min})}{(d_{max} - d_{min})(L_{min} - L_{max})} \cdot M_{22} \quad (2)$$

In the case of the application at issue, $M_{21}=M_{22}$ and $L_{min}=0$, therefore the equation (2) is equivalent to the following:

$$M(d, L) = \frac{(d_{max} - d)(L_{max} - L)}{-L_{max} \cdot (d_{min} - d_{max})} \cdot M_{11} + \frac{(d - d_{min})(L_{max} - L)}{-L_{max} \cdot (d_{min} - d_{max})} \cdot M_{21} + \frac{(d_{max} - d)(L - L_{min})}{-L_{max} \cdot (d_{min} - d_{max})} \cdot M_{12} + \frac{(d - d_{min})(L - L_{min})}{-L_{max} \cdot (d_{min} - d_{max})} \cdot M_{21} \quad (3)$$

in which:

$M_{11}$, $M_{12}$, $M_{21}=M_{22}$ correspond to the first, the second, and the third reference matrices, respectively;

$d_{in}$ and $d_{max}$ represent the preset minimum and maximum distances between the projection apparatus 100 and the screen 101 in which it is possible to reproduce, substantially without errors, the colors of a standard space in the absence of ambient light, i.e., with L=0;

$L_{max}$ is the maximum ambient light intensity value (measured in lux) at which it is possible to reproduce substantially without errors the colors of a standard space at the distance $d_{min}$.

In particular, the bilinear interpolation operation is performed by a processing module 102A included in the graphic processing unit 102.

Based on the equation (3), the second conversion matrix M2'=M(d,L) converts the third triad of parameters X, Y, Z into the fourth triad of parameters, i.e., in the linear monochromatic color primitives $R_L$, $G_L$, $B_L$ taking into account both the piece of information of the distance d between the pico-projector 104 and the screen 101 and the piece of information of light intensity L. In such a manner, the projection apparatus 100 can reproduce the input color gamut of the standard space (input small gamut), for example, sRGB or adobe RGB, in an accurate manner as the distance d of the apparatus 100 from the screen 101 varies, and as the ambient light intensity L varies.

With reference to an embodiment described in conjunction with FIG. 3, FIG. 4 is a schematic representation of the above-mentioned bilinear interpolation.

In particular, the distances from the screen 101 that are smaller than the minimum distance $d_{min}$ do not represent a valid parameter to compute the second matrix M2, since they correspond to positions in which the projection apparatus 100 is too near to the screen 101 surface. Therefore, the detected distance $d<d_{min}$ values are assimilated to the value of such a minimum distance.

For distance $d>d_{min}$ values, the second conversion matrix M2 is traceable, by interpolation, within a triangle T having as its vertexes the above-mentioned first $M_{11}$, the second $M_{12}$, and the third $M_{21}$ reference matrices.

For distance $d>d_{max}$ values, or in the case that the light intensity L takes values such as:

$$L \geq \frac{(d - d_{max}) \cdot L_{max}}{(d_{min} - d_{max})} \quad (4)$$

i.e., outside the triangle T of FIG. 4, the projection apparatus 100 uses the whole gamut of the color space.

Example

Figure 6:
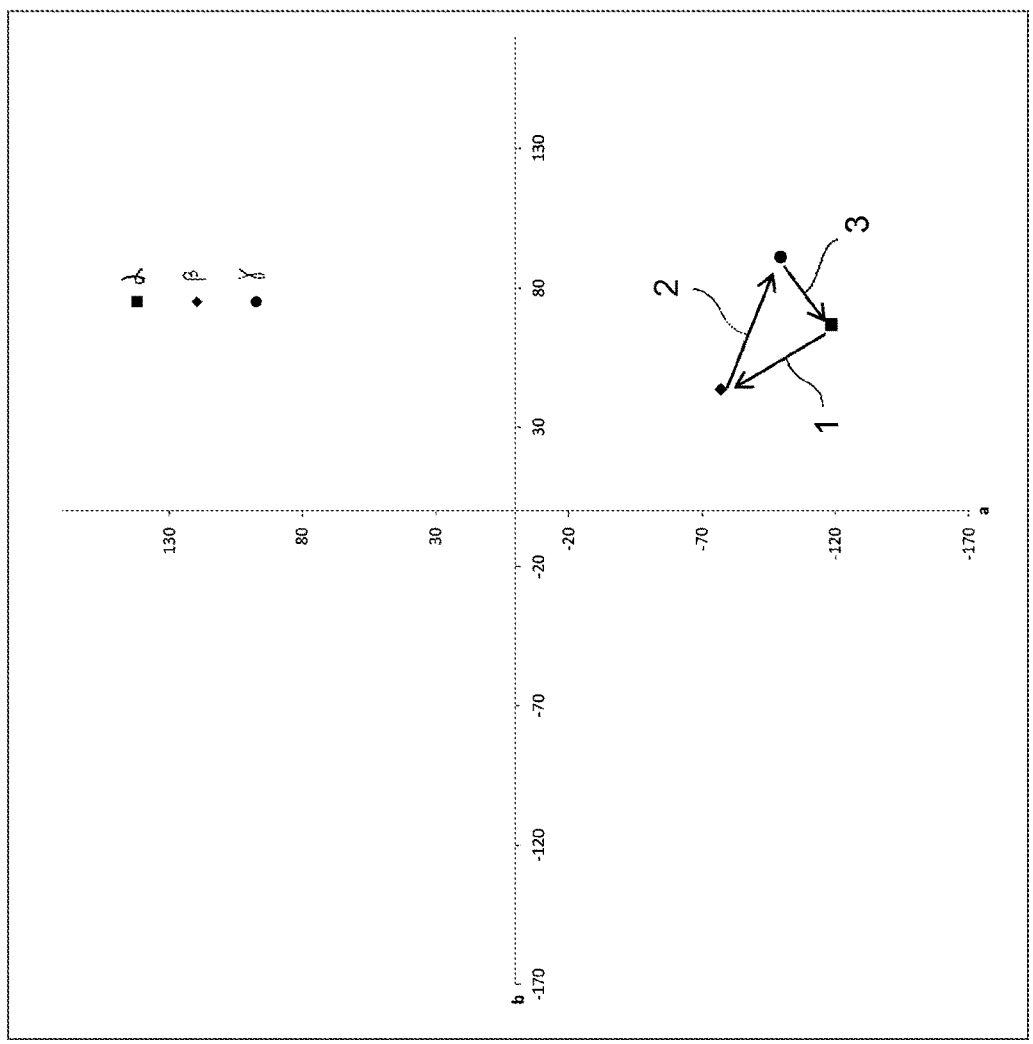
FIG. 6 shows by way of example results of a simulation relating to a recovery of the chromatic accuracy of a color determined according to an embodiment of a conversion method.

FIG. 6 shows by way of example the results of a simulation relative to the recovery of the chromatic accuracy of a color by an embodiment as the distance d from the screen 101 varies.

In particular, FIG. 6 shows a representation plane (a,b) of the standard uniformly perceptual color space Lab. The simulation relates to two sample distances $d_1$ and $d_2$ in the range [$d_{min}$, $d_{max}$] between the minimum and maximum distances characterizing the apparatus 100. FIG. 6 shows the positions of a color, in particular the color blue (0,0,255) in the plane (a,b) of the color space as the distance varies. In more detail, by the symbol α the chromatic level of the above-mentioned color at the distance $d_1$ is set forth, without the intervention of the correction implementing the embodiment, the symbol β represents the chromatic level of the color at the distance $d_2$ without correction, and with y is indicated the native color space at the distance $d_2$ without correction.

The simulation refers in particular to a case in which the distance d increases from $d_1$ to $d_2$ (with $d_2 > d_1$) and for L=0 lux. However, similar results can be obtained also in the case that the distance decreases.

By analyzing in detail the three steps, i.e., step 1, step 2, and step 3, illustrated by respective arrows in FIG. 6, the following are the results.

Step 1—as the distance d from $d_1$ to $d_2$ from the projection surface 101 increases, the colors tend to shift to the origin (0,0) of the plane, i.e., towards the axis of the neutral colors or grey scale.

Step 2—by using a device ensuring a higher gamut than that of a standard space, for example, a laser pico-projector 104, but without controlling the chromatic accuracy, the chromaticity level at the distance $d_2$ can be recovered also if it is not accurate. In fact, the native primaries RGB of the pico-projector do not generally correspond, as regards the hue, to those of the starting standard color space.

Step 3—an embodiment allows recovering the chromatic accuracy of the color at the distance $d_2 > d_1$.

In view of what has been stated above, the projection apparatus 100 according to an embodiment compensates for the variations in the distance d from the screen 101 and the ambient light L intensity through a modification of the color processing parameters in accordance with the method described above to ensure a correct representation of the colors of the images projected on the screen.

To the embodiments of the electronic digital image projection apparatus and to the embodiments of relative conversion method described above, those skilled in the art, in order to meet contingent needs, will be able to make modifications, adaptations, and replacements of elements with other functionally equivalent ones, without departing from the scope of the disclosure. Each of the characteristics described as belonging to a possible embodiment can be implemented independently from the other embodiments described.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A method, comprising:
converting a digital image from a first color space associated with an electronic source device to a second color space associated with a digital image projection apparatus, the digital image including a plurality of pixels and each pixel of the digital image being associated with a first triad of parameters representative of the first color space and being associated with a second triad of parameters representative of the second color space, the converting including: applying, by the digital image projection apparatus, a first conversion matrix to map the first triad of parameters of each pixel in the digital image to a corresponding third triad of parameters, the third triad of parameters of the pixels in digital image being representative of a third color space that is independent of the first color space and the second color space; applying, by the digital image projection apparatus, a second conversion matrix to map the third triad of parameters of each pixel in the digital image to a corresponding second triad of parameters representative of the second color space; and computing, by the digital image projection apparatus, coefficients of the second conversion matrix based on a variable distance between the projection apparatus and a screen onto which the digital image projection apparatus is to project the digital image.

2. The method of claim 1, wherein computing coefficients of the second conversion matrix further comprises:
generating a first reference matrix, the first reference matrix corresponding to the second conversion matrix with coefficients having values based on the variable distance being equal to a minimum distance between the digital image projection apparatus and the screen;
generating a second reference matrix, the second reference matrix corresponding to the second conversion matrix with coefficients having values based on the variable distance being equal to a maximum distance between the digital image projection apparatus and the screen; and
computing the coefficients of the second conversion matrix based on the variable distance and a linear interpolation of the coefficients of the first and second reference matrices.

3. The method of claim 2, wherein computing the coefficients of the second conversion matrix based on a linear interpolation of the coefficients of the first and second reference matrices comprises computing the coefficients of the second conversion matrix through a linear interpolation given by the formula:

$$M(d) = \begin{cases} M(d_{min}), & d \leq d_{min} \\ \frac{(d - d_{min}) \cdot (M(d_{max}) - M(M(d_{min})))}{d_{max} - d_{min}} + M(d_{min}), & d_{min} < d < d_{max} \\ M(d_{max}), & d \geq d_{max} \end{cases}$$

wherein $d_{min}$ and $d_{max}$ represent the minimum and maximum distances between the digital image projection apparatus and the screen, respectively; and
wherein $M(d_{min})$ and $M(d_{max})$ are the first and the second reference matrices, respectively.

4. The method of claim 1, wherein computing coefficients of the second conversion matrix further comprises computing the coefficients based on an ambient light intensity value.

5. The method of claim 4, wherein computing coefficients of the second conversion matrix further comprises:
generating a first reference matrix, the first reference matrix corresponding to the second conversion matrix with coefficients having values based on the variable distance being equal to a minimum distance between the digital image projection apparatus and the screen and the ambient light intensity value being equal zero;
generating a second reference matrix, the second reference matrix corresponding to the second conversion matrix with coefficients having values based on the variable distance being equal to the minimum distance between the digital image projection apparatus and the screen and the ambient light intensity value being equal to a maximum value;
generating a third reference matrix, the third reference matrix corresponding to the second conversion matrix with coefficients having values based on the variable distance being equal to a maximum distance between the digital image projection apparatus and the screen and the ambient light intensity value being equal zero; and computing the coefficients of the second conversion matrix based on the variable distance and the ambient light intensity value and a bilinear interpolation of the coefficients of the first, second and third reference matrices.

6. The method of claim 5, wherein computing the coefficients of the second conversion matrix based on the variable distance and the ambient light intensity value and a bilinear interpolation of the coefficients of the first, second and third reference matrices comprises computing the coefficients of the second conversion matrix through a bilinear interpolation given by the formula:

$$M(d, L) = \frac{(d_{max} - d)(L_{max} - L)}{-L_{max} \cdot (d_{min} - d_{max})} \cdot M_{11} + \frac{(d - d_{min})(L_{max} - L)}{-L_{max} \cdot (d_{min} - d_{max})} \cdot M_{21} + \frac{(d_{max} - d)(L - L_{min})}{-L_{max} \cdot (d_{min} - d_{max})} \cdot M_{12} + \frac{(d - d_{min})(L - L_{min})}{-L_{max} \cdot (d_{min} - d_{max})} \cdot M_{21}$$

where $M_{11}$, $M_{12}$, $M_{21}$ are the first, second, and third reference matrices, respectively;

$d_{min}$ and $d_{max}$ represent the minimum and maximum distances between the digital image projection apparatus and the screen; and $L_{max}$ is the maximum ambient light intensity value.

7. The method of claim 1, wherein converting the digital image from the first color space associated with the electronic source device to the second color space associated with the digital image projection apparatus comprises converting the digital image from the first color space comprising one of the Adobe RGB, sRGB and pro-Photo RGB color spaces to the second color space comprising the color space of one of a laser pico-projector, an LED projector and a Liquid Crystal on Silicon (LCOS) projector.

8. An electronic image projection apparatus, comprising:
an output projection circuit configured to project a processed digital image onto a screen;
a distance sensor configured to generate a distance signal indicating a distance between the output projection device and the screen;
a processing circuit coupled to the distance and ambient light sensors to receive the distance and lightness intensity signals and coupled to receive an input digital image from an electronic source device having a first color space associated with the electronic source device, the processing circuit including a color management circuit configured to convert the input digital image from a first color space associated with the electronic source device to a second color space associated with the output projection circuit, each pixel of the input digital image being associated with a first triad of parameters representative of the first color space and each pixel of the processed digital image being associated with a second triad of parameters representative of the second color space, the color management circuit configured to:
apply a first conversion matrix to map the first triad of parameters of each pixel in the input digital image to a corresponding third triad of parameters representative of a third color space that is independent of the first and second color spaces, each third triad of parameters being associated with a pixel in an independent digital image in the third color space;
apply a second conversion matrix to map the third triad of parameters of each pixel in the independent digital image to a corresponding second triad of parameters for each pixel of the processed digital image in the second color space; and
compute coefficients of the second conversion matrix based on the distance indicated by the distance signal between the output projection circuit and the screen onto which the output projection circuit is to project the processed digital image.

9. The electronic image projection apparatus of claim 8, wherein the processing circuit is configured to receive a flow of input digital images from the electronic source device, the processing circuit configured to control the output projection circuit to project each of the digital images in the flow onto the screen.

10. The electronic image projection apparatus of claim 8, wherein the output projection circuit comprises one of a laser pico-projector, and LED projector, and a Liquid Crystal on Silicon (LCOS) projector.

11. The electronic image projection apparatus of claim 8 wherein the processing circuit further comprises a memory configured to store a first reference matrix and a second reference matrix, the first reference matrix corresponding to the second conversion matrix with coefficients having values based on the distance signal equal having a value indicating a minimum distance between the output projection circuit and the screen and the second reference matrix corresponding to the second conversion matrix with coefficients having values based on the distance signal having a value indicating a maximum distance between the output projection circuit and the screen.

12. The electronic image projection apparatus of claim 11, wherein the color management circuit is further configured to compute the coefficients of the second conversion matrix based on the value of the distance signal and on a linear interpolation of the coefficients of the first and second reference matrices.

13. The electronic image projection apparatus of claim 12, wherein the color management circuit is further configured to perform a linear interpolation on the coefficients of the first and second reference matrices through the formula:

$$M(d) = \begin{cases} M(d_{min}), & d \leq d_{min} \\ \frac{(d - d_{min}) \cdot (M(d_{max}) - M(M(d_{min})))}{d_{max} - d_{min}} + M(d_{min}), & d_{min} < d < d_{max} \\ M(d_{max}), & d \geq d_{max} \end{cases}$$

wherein $d_{min}$ and $d_{max}$ represent the minimum and maximum distances between the digital image projection apparatus and the screen, respectively; and wherein $M(d_{min})$ and $M(d_{max})$ are the first and the second reference matrices, respectively.

14. The electronic image projection apparatus of claim 8 further comprising:
an ambient light sensor configured to generate a lightness intensity signal indicating a lighting intensity of an environment surrounding the electronic image projection apparatus; and
wherein the color management circuit is further configured to compute coefficients of the second conversion matrix based on the lightness intensity signal.

15. The electronic image projection apparatus of claim 14, wherein the processing circuit further comprises a memory configured to store a first reference matrix, a second reference matrix, and a third reference matrix, the first reference matrix corresponding to the second conversion matrix with coefficients having values based on the distance signal having a value indicating a minimum distance between the output projection circuit and the screen and the lightness intensity signal having a value indicating zero lightness intensity, the second reference matrix corresponding to the second conversion matrix with coefficients having values based on the distance signal having a value indicating the minimum distance between the output projection circuit and the screen and the lightness intensity signal having the value indicating a maximum lightness intensity, and the third reference matrix corresponding to the second conversion matrix with coefficients having values based on the distance signal having a value indicating the maximum distance between the output projection circuit and the screen and the lightness intensity signal having value indicating zero lightness intensity.

16. The electronic image projection apparatus of claim 15, wherein the color management circuit is further configured to compute the coefficients of the second conversion matrix based on the distance and lightness intensity signals and on a bilinear interpolation of the coefficients of the first, second and third reference matrices.

17. The electronic image projection apparatus of claim 16, wherein the color management circuit is further configured to perform the bilinear interpolation on the coefficients of the first, second and third reference matrices through the formula:

$$M(d, L) = \frac{(d_{max} - d)(L_{max} - L)}{-L_{max} \cdot (d_{min} - d_{max})} \cdot M_{11} + \frac{(d - d_{min})(L_{max} - L)}{-L_{max} \cdot (d_{min} - d_{max})} \cdot M_{21} + \frac{(d_{max} - d)(L - L_{min})}{-L_{max} \cdot (d_{min} - d_{max})} \cdot M_{12} + \frac{(d - d_{min})(L - L_{min})}{-L_{max} \cdot (d_{min} - d_{max})} \cdot M_{21}$$

where $M_{11}$, $M_{12}$, $M_{21}$ are the first, second, and third reference matrices, respectively;

$d_{min}$ and $d_{max}$ represent the minimum and maximum distances between the digital image projection apparatus and the screen; and $L_{max}$ is the maximum ambient light intensity value.

* * * * *